US010367393B2

(12) United States Patent
Nakatake et al.

(10) Patent No.: US 10,367,393 B2
(45) Date of Patent: Jul. 30, 2019

(54) MOTOR ROTATOR, MOTOR DEVICE, AND METHOD FOR MANUFACTURING THE MOTOR ROTATOR

(71) Applicant: SANYO DENKI CO., LTD., Tokyo (JP)

(72) Inventors: Kouji Nakatake, Tokyo (JP); Masaaki Ohashi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 316 days.

(21) Appl. No.: 15/065,377

(22) Filed: Mar. 9, 2016

(65) Prior Publication Data

US 2016/0268871 A1   Sep. 15, 2016

(30) Foreign Application Priority Data

Mar. 12, 2015   (JP) .................... 2015-049569

(51) Int. Cl.
| H02K 7/08 | (2006.01) |
| H02K 1/27 | (2006.01) |
| H02K 15/03 | (2006.01) |
| H02K 7/00 | (2006.01) |

(52) U.S. Cl.
CPC ........... *H02K 7/003* (2013.01); *H02K 1/2706* (2013.01); *H02K 1/2713* (2013.01); *H02K 7/08* (2013.01); *H02K 7/083* (2013.01); *H02K 15/03* (2013.01); *H02K 2205/03* (2013.01)

(58) Field of Classification Search
CPC ................................. H02K 7/08; H02K 7/003
USPC ...................... 310/90, 401, 425, 49.38, 49.39
See application file for complete search history.

(56) References Cited

U.S. PATENT DOCUMENTS

| 2,504,825 A | * | 4/1950 | Meyer | ............... H02K 15/0012 |
| | | | | 310/211 |
| 3,914,071 A | * | 10/1975 | Friese | ................... F04D 29/059 |
| | | | | 184/6.27 |
| 6,144,131 A | * | 11/2000 | Hollenbeck | ............ H02K 1/276 |
| | | | | 310/156.53 |

(Continued)

FOREIGN PATENT DOCUMENTS

| JP | 05146102 A | * | 6/1993 |
| JP | 2009201338 | | 9/2009 |

(Continued)

OTHER PUBLICATIONS

Machine Translation, Kojima, JP 05146102 A, Jun. 1993.*

(Continued)

*Primary Examiner* — Thomas Truong
(74) *Attorney, Agent, or Firm* — Rankin, Hill & Clark LLP (57) ABSTRACT

A motor rotator includes: a rotor shaft configured to be journaled to a pair of bearing members of a motor device; and a rotor stack that includes a plurality of lamination plates and a plurality of small-diameter plates having an outer diameter smaller than an outer diameter of the lamination plates, the lamination plates and the small-diameter plates being stacked in an axial direction of the rotor shaft and integrated. The plurality of small-diameter plates forms a pair of bosses, the pair of bosses projecting from both sides of the plurality of lamination plates along the axial direction of the rotor shaft to abut on the pair of bearing members.

17 Claims, 4 Drawing Sheets

(56) References Cited

U.S. PATENT DOCUMENTS

| | | | |
|---|---|---|---|
| 6,265,802 B1 * | 7/2001 | Getschmann | H02K 1/2713 |
| | | | 310/156.34 |
| 7,868,497 B2 | 1/2011 | Miyairi et al. | |
| 2011/0304225 A1 * | 12/2011 | Terashita | H02K 5/04 |
| | | | 310/49.37 |

FOREIGN PATENT DOCUMENTS

| | | | | |
|---|---|---|---|---|
| JP | 2012244736 A | | 12/2012 | |
| JP | 2014045630 A | * | 3/2014 | H02K 1/28 |
| JP | 2014-068416 | | 4/2014 | |
| JP | 2014068416 A | | 4/2014 | |
| JP | 2014082832 A | | 5/2014 | |
| WO | 2012137235 A1 | | 10/2012 | |

OTHER PUBLICATIONS

Machine Translation, Nagahiro, JP 2014045630 A, Mar. 2014.*
Notification of Reasons for Refusal dated Aug. 7, 2018 for the corresponding Japanese Patent Application No. 2015-049569.

* cited by examiner

MOTOR ROTATOR, MOTOR DEVICE, AND METHOD FOR MANUFACTURING THE MOTOR ROTATOR

CROSS-REFERENCE TO RELATED APPLICATION

This application claims priority from Japanese Patent Application No. 2015-049569 filed with the Japan Patent Office on Mar. 12, 2015, the entire content of which is hereby incorporated by reference.

BACKGROUND

1. Technical Field

The present disclosure relates to a motor rotator, a motor device, and a method for manufacturing the motor rotator.

2. Description of the Related Art

In a motor device, an electromagnetic induction effect occurs between a stator and a rotor stack of a rotator disposed inside the stator. This rotates the rotator inside the stator. In view of this, as disclosed in JP-A-2009-201338, the motor rotator is rotatably journaled to a pair of bearing members.

SUMMARY

A motor rotator includes: a rotor shaft configured to be journaled to a pair of bearing members of a motor device; and a rotor stack that includes a plurality of lamination plates and a plurality of small-diameter plates having an outer diameter smaller than an outer diameter of the lamination plates, the lamination plates and the small-diameter plates being stacked in an axial direction of the rotor shaft and integrated. The plurality of small-diameter plates forms a pair of bosses, the pair of bosses projecting from both sides of the plurality of lamination plates along the axial direction of the rotor shaft to abut on the pair of bearing members.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With a motor device, for example, bearing members are appropriately positioned such that a motor rotator rotates with two rotor stacks facing to one another at an appropriate position inside a stator.

Here, the following describes an example of a structure to appropriately position the bearing members in the motor rotator. In the example illustrated in FIG. 4, a diameter of a center 101a to which rotor stacks 102 and 103 are mounted in a rotor shaft 101 is larger than a diameter of both ends 101b. A pair of bearing members 104 is positioned with both end surfaces of this center 101a.

Figure 4:
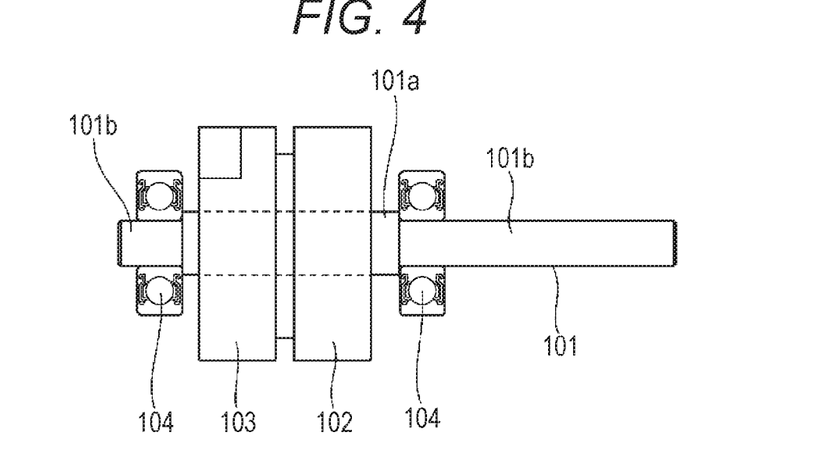
FIG. 4 is a drawing describing a structure of the motor rotator according to a first comparative example.

However, in this example, to configure the diameter of the center 101a of the rotor shaft 101 larger than the diameter of the both ends 101b, a thick columnar-shaped shaft member is used. Moreover, both end parts of the thick shaft member is cut. Furthermore, to restrain a shift of a shaft center of the rotor shaft, after the cutting work, the both end parts of the shaft member are polished.

Figure 5:
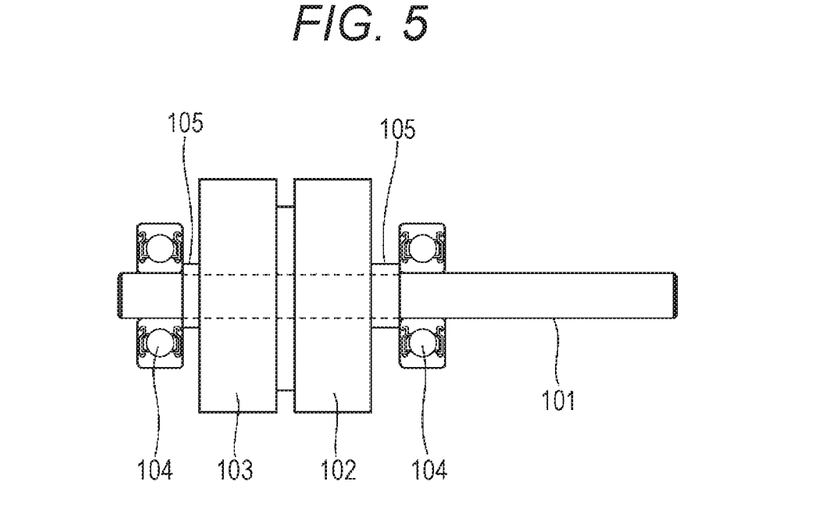
FIG. 5 is a drawing describing the structure of the motor rotator according to a second comparative example.

In the example illustrated in FIG. 5, to appropriately position the bearing members in the motor rotator, a pair of collar members 105, which is made of metal or made of resin, is adhesively secured to both sides of the rotor stacks 102 and 103. This pair of collar members 105 positions the pair of bearing members 104.

However, in this example, separately from the motor rotator, the pair of collar members 105 is used. This adds a process of bonding the pair of collar members 105 to the motor rotator. Moreover, to appropriately position the bearing members with the collar members 105, the collar members 105 are formed at high accuracy.

For the motor device, it is requested that the motor rotator ensures appropriately positioning the bearing members without increasing the number of assembled components used for the motor rotator or the total number of processes for the assembly.

A motor rotator according to one aspect of the present disclosure (the present motor rotator) includes: a rotor shaft configured to be journaled to a pair of bearing members of a motor device; and a rotor stack that includes a plurality of lamination plates and a plurality of small-diameter plates having an outer diameter smaller than an outer diameter of the lamination plates, the lamination plates and the small-diameter plates being stacked in an axial direction of the rotor shaft and integrated. The plurality of small-diameter plates forms a pair of bosses, the pair of bosses projecting from both sides of the plurality of lamination plates along the axial direction of the rotor shaft to abut on the pair of bearing members.

In the rotor stack of the present motor rotator, small-diameter plates having an outer diameter (an outer periphery) smaller than the outer diameter of a plurality of lamination plates are stacked in an axial direction of a rotor shaft and integrated on both sides of the lamination plates. This forms a pair of projecting bosses. The pair of bosses ensures positioning the pair of bearing members.

Moreover, the bosses are formed by stacking the plurality of small-diameter plates in the axial direction of the rotor shaft. Accordingly, accuracy of an amount of projection of the bosses becomes equal (or approximately equal) to accuracy of a thickness of the small-diameter plate. This ensures obtaining necessary and sufficient accuracy to position the bearing members.

A pair of bosses, which positions the bearing members, is formed on the rotor stack sides. In view of this, as the rotor shaft, for example, a columnar-shaped rotor shaft with uniform diameter is applicable. This eliminates a need for processing the center of the rotor shaft so as to have a diameter larger than the both ends to position the bearing members. This also eliminates a need for preparing a pair of collar members, which is an assembled component separated from the motor rotator.

According to one aspect of the present disclosure, a columnar-shaped rotor shaft with a uniform diameter is inserted into and secured to center holes of the rotor stacks with which the bosses are preliminary integrated. This ensures easily assembling the present motor rotator.

Thus, according to one aspect of the present disclosure, the motor rotator with a structure that ensures appropriately positioning the bearing members without increasing the number of assembled components used for the motor rotator or the total number of processes for the assembly can be easily manufactured.

The following describes embodiments of the present disclosure with reference to the drawings.

Figure 1:
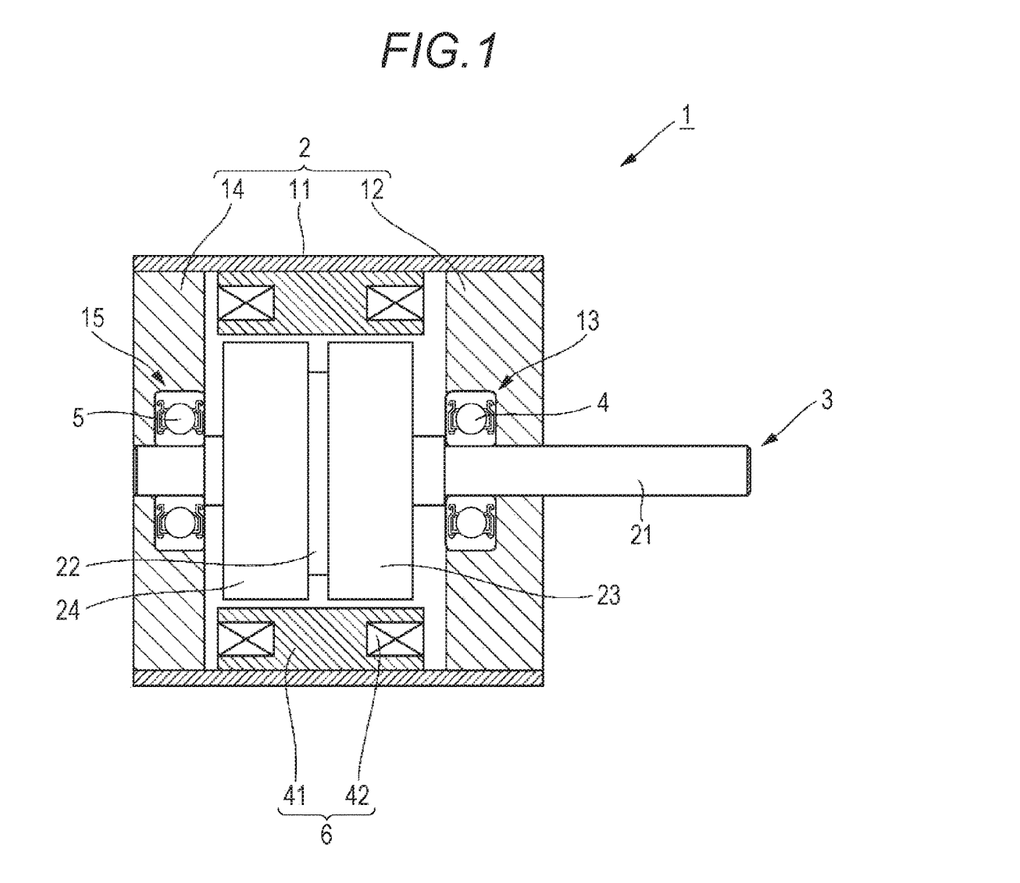
FIG. 1 is a schematic cross-sectional view of a partially cutout motor device with a motor rotator according to an embodiment of the present disclosure.

FIG. 1 is a schematic cross-sectional view of a partially cutout motor device 1 with a motor rotator 3 according to the embodiment.

The motor device 1 illustrated in FIG. 1 includes a housing 2, the motor rotator 3, a first bearing member 4, a second bearing member 5, and a stator member 6.

In the housing 2, fitting a first end bracket 12 and a second end bracket 14 to both end openings of a cylindrical-shaped case 11 forms an internal space. In the internal space of the housing 2, the stator member 6, which includes a stator stack 41 and a winding wire 42, and the motor rotator 3 are disposed.

The motor rotator 3 includes a columnar-shaped rotor shaft 21 with uniform diameter, a permanent magnet 22, a first rotor stack 23, and a second rotor stack 24. The first rotor stack 23, the permanent magnet 22, and the second rotor stack 24 are secured to the rotor shaft 21 in this order.

One end part of the rotor shaft 21 projecting from the first rotor stack 23 is inserted into the first bearing member 4 mounted to the first end bracket 12 and then projects to the outside of the housing 2. The other end part of the rotor shaft 21 projecting from the second rotor stack 24 is inserted into the second bearing member 5 mounted to the second end bracket 14. This rotatably journals the motor rotator 3 to the inside of the stator member 6.

That is, the rotor shaft 21 is inserted into the pair of bearing members 4 and 5. The rotor shaft 21 is journaled to (configured to be journaled to) the pair of bearing members 4 and 5. The stator member 6 is disposed at the peripheral areas of the rotor stacks 23 and 24 in the housing 2. The pair of bearing members 4 and 5 abuts on a pair of bosses 56 (described later) in the motor rotator 3 and rotatably journals the motor rotator 3 in the housing 2. The rotor stacks 23 and 24 include the pair of bosses 56 (described later).

Thus, a movable-side magnetic-field-generating structure, which includes the rotatable motor rotator 3, is positioned inside the securing-side magnetic-field-generating structure, which includes the stator member 6. Transmission of electricity to the winding wire 42 of the stator member 6 generates a suction action or a repulsion between the stator member 6 and the motor rotator 3 caused by a magnetic force. This ensures rotating the motor rotator 3.

FIGS. 2A to 2D are drawings describing the structure of the rotor stack in FIG. 1. The first rotor stack 23 and the second rotor stack 24 have a structure in which three types of a plurality of lamination plates are stacked and integrated.

Figure 2A:
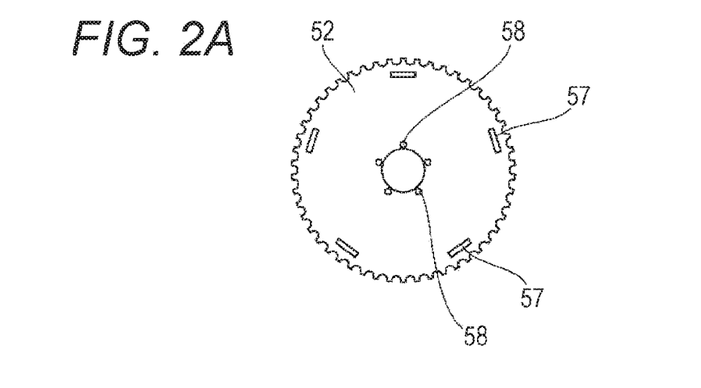
FIGS. 2A to 2D are drawings describing a structure of a rotor stack according to the embodiment of the present disclosure.

A large-diameter plate-shaped lamination plate (a lamination plate) 52, which is illustrated in FIG. 2A, has a circular-plate shape with an outer periphery (an outer diameter) slightly larger than the ring-shaped permanent magnet 22. The large-diameter plate-shaped lamination plate 52 is formed with the outer diameter larger than outer rotators 32 of the first bearing member 4 and the second bearing member 5. At the center of the large-diameter plate-shaped lamination plate 52, a hole whose diameter is slightly larger than the rotor shaft 21 is formed.

Figure 2B:
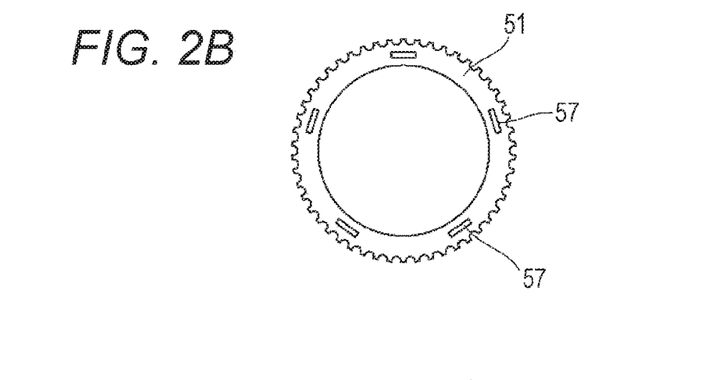

A large-diameter ring-shaped lamination plate (the lamination plate) 51, which is illustrated in FIG. 2B, has a ring shape with the outer periphery (the outer diameter) identical (or approximately identical) size to the large-diameter plate-shaped lamination plate 52. The inner diameter of the large-diameter ring-shaped lamination plate 51, which has the ring shape, is formed into a size into which the ring-shaped permanent magnet 22 is insertable.

Figure 2C:
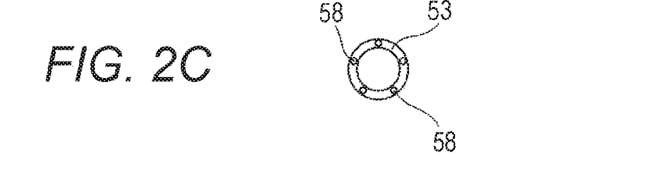

A small-diameter ring-shaped lamination plate (the small-diameter plate, the small-diameter lamination plate) 53, which is illustrated in FIG. 2C, is formed with a diameter (an outer diameter) smaller than the outer rotator 32 of the first bearing member 4 or the second bearing member 5. At the center of the small-diameter ring-shaped lamination plate 53, a hole whose diameter is slightly larger than the rotor shaft 21 is formed. These three types of lamination plates are, for example, made of electromagnetic steel plate. The electromagnetic steel plate, for example, can be obtained by forming a mixture of a magnetic material and a metallic material into a plate shape. Thus, the large-diameter ring-shaped lamination plate 51, the large-diameter plate-shaped lamination plate 52, and the small-diameter ring-shaped lamination plate 53 may be formed of an identical material.

Figure 2D:
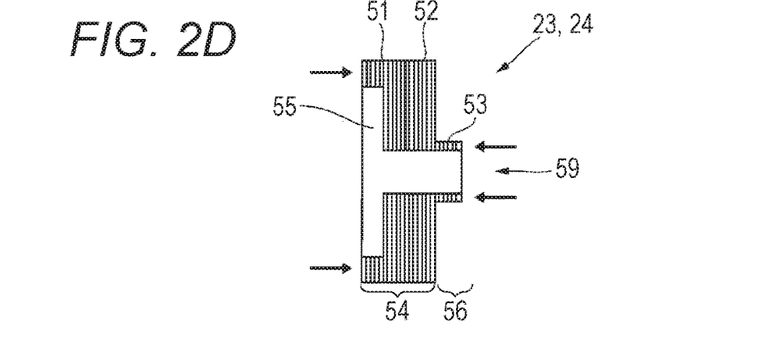

As illustrated in FIG. 2D, these three types of lamination plates are integrated by being crimped to one another in a thickness direction (in a direction illustrated by the arrows in FIG. 2D) with the lamination plates concentrically stacked to one another.

A plurality of outer crimps 57 is formed along the outer peripheral edge of the large-diameter plate-shaped lamination plate 52. The plurality of outer crimps 57 is formed along the outer peripheral edge of the large-diameter ring-shaped lamination plate 51. These outer crimps 57 integrate (bond) the large-diameter plate-shaped lamination plate 52 and the large-diameter ring-shaped lamination plate 51. This forms a main stack 54. When the permanent magnet 22 is housed in a magnet-use hollow 55, the main stack 54 generates the magnetic force.

A plurality of inner crimps 58 is formed along the inner peripheral edge of the large-diameter plate-shaped lamination plate 52. Furthermore, along the inner peripheral edge (the outer periphery) of the small-diameter ring-shaped lamination plate 53, the plurality of inner crimps 58 is formed. These inner crimps 58 bond the plurality of small-diameter ring-shaped lamination plates 53 and the plurality of large-diameter plate-shaped lamination plates 52 along the thickness direction. The inner crimps 58 of the large-diameter plate-shaped lamination plate 52 are disposed, for example, so as to correspond to the inner crimps 58 of the small-diameter ring-shaped lamination plate 53.

These inner crimps 58 integrate (bond) the large-diameter plate-shaped lamination plate 52 and the small-diameter ring-shaped lamination plate 53 along the thickness direction. This integrally forms the boss 56. The boss 56 projects from the main stack 54 to the opposite side of the magnet-use hollow 55. A center hole 59, which passes through the main stack 54 and the boss 56, is formed.

Figure 3A:
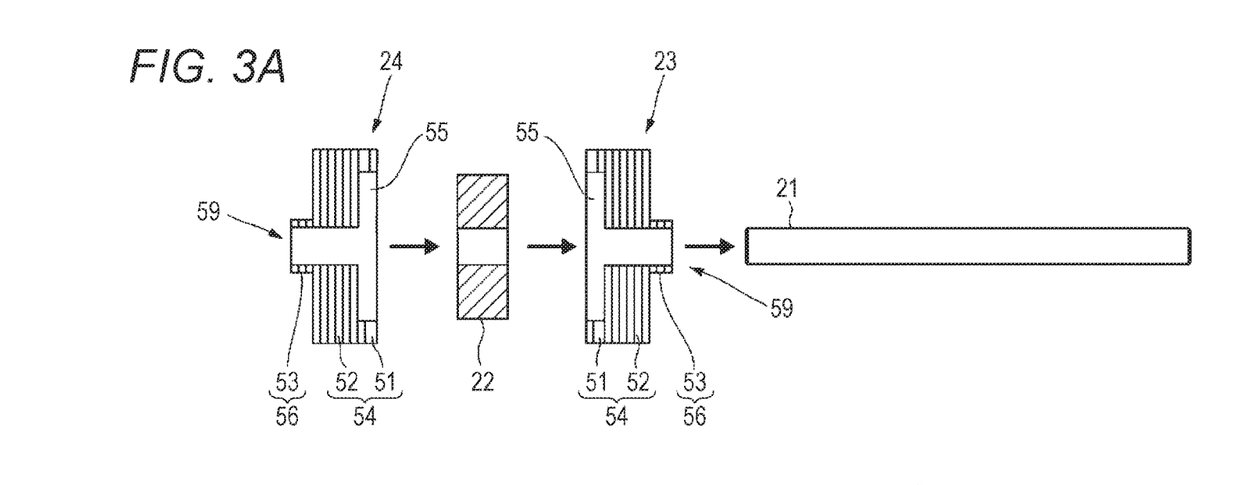
FIGS. 3A and 3B are explanatory views for a procedure of assembling the motor rotator.
Figure 3B:
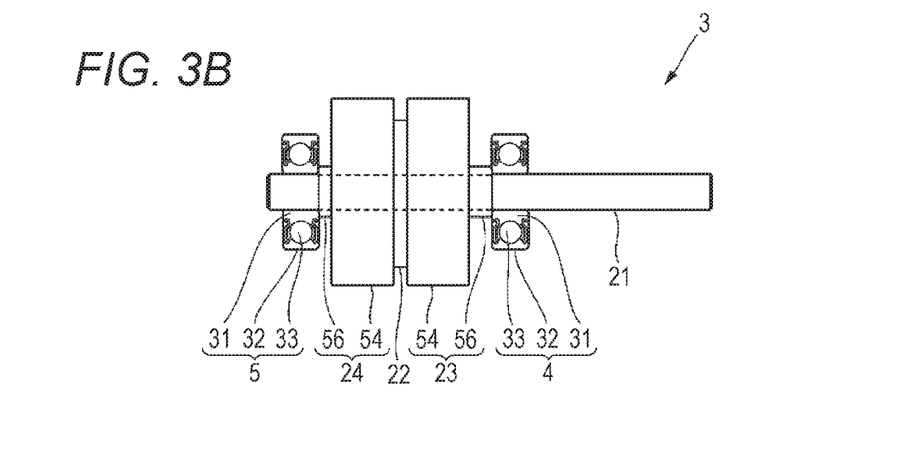

FIGS. 3A and 3B are explanatory views for an assembly procedure (a manufacturing method) for the motor rotator 3 in FIG. 1.

The method for manufacturing the motor rotator 3 includes the formation of the rotor stacks 23 and 24 as described above. This formation of the rotor stacks 23 and 24 includes stacking, in the axial direction (the thickness direction) of the rotor shaft 21, and integrating the plurality of large-diameter plate-shaped lamination plates 52 and the plurality of small-diameter ring-shaped lamination plates 53 which has the outer diameter smaller than an outer diameter of the large-diameter plate-shaped lamination plates 52.

Further, as illustrated in FIG. 3A, first, the columnar-shaped rotor shaft 21 is movably inserted into the center hole 59 on the first rotor stack 23. At a predetermined position in the axial direction, the boss 56 of the first rotor stack 23 is squashed to radially inside.

Next, the rotor shaft 21 is movably inserted into the center hole on the ring-shaped permanent magnet 22. Furthermore, the rotor shaft 21 is movably inserted into the center hole 59 on the second rotor stack 24. Then, with the permanent magnet 22 sandwiched between the magnet-use hollow 55 of the second rotor stack 24 and the magnet-use hollow 55 of the first rotor stack 23, the boss 56 of the second rotor stack 24 is squashed to radially inside. That is, the method for manufacturing the motor rotator 3 includes inserting and securing the rotor shaft 21 to the center holes 59 of the rotor stacks 23 and 24.

As illustrated in FIG. 3B, this forms the motor rotator 3. By being sandwiched between the first rotor stack 23 and the second rotor stack 24, which are secured to the rotor shaft 21, the permanent magnet 22 is secured to the rotor shaft 21. The boss 56 of the first rotor stack 23 and the boss 56 of the second rotor stack 24 project outward in the axial direction of the rotor shaft 21.

As also illustrated in FIG. 3B, the first bearing member 4 is inserted into the rotor shaft 21. In the first bearing member 4, an inner rotator 31 is rotatable inside the outer rotator 32 via a bearing ball 33. This inner rotator 31 abuts on the boss 56 of the first rotor stack 23. In the second bearing member 5, the inner rotator 31 abuts on the boss 56 of the second rotor stack 24.

In view of this, as illustrated in FIG. 1, the bearing members 4 and 5 are configured to be appropriately positioned. This ensures rotating the motor rotator 3 with the first rotor stack 23 and the second rotor stack 24 facing the stator member 6.

In this embodiment, the bosses 56 on which the bearing members 4 and 5 can abut are formed by stacking the plurality of small-diameter ring-shaped lamination plates 53. Accordingly, the accuracy of amount of projection of the bosses 56 is similar to the accuracy of the thickness of the small-diameter ring-shaped lamination plates 53. This ensures obtaining accuracy necessary and sufficient to position the bearing members 4 and 5.

As described above, the first rotor stack 23 and the second rotor stack 24 according to the embodiment include the small-diameter ring-shaped lamination plates 53 on both sides of the plurality of large-diameter plate-shaped lamination plates 52. The small-diameter ring-shaped lamination plates 53 have the outer periphery (the outer diameter) smaller than the large-diameter plate-shaped lamination plates 52 and are stacked in the axial direction of the rotor shaft 21 and integrated. This forms the pair of projecting bosses 56. The pair of bosses 56 abutting on the pair of bearing members of the motor device 1 ensures positioning the bearing members 4 and 5.

Thus, the plurality of small-diameter ring-shaped lamination plates 53 forms the pair of bosses 56. To abut on the pair of bearing members 4 and 5, the pair of bosses 56 projects from both sides of the large-diameter plate-shaped lamination plate 52 along the axial direction of the rotor shaft 21.

Moreover, the boss 56 is formed by stacking the plurality of small-diameter ring-shaped lamination plates 53 in the axial direction of the rotor shaft 21. Accordingly, accuracy of the amount of projection of the bosses 56 becomes high accuracy corresponding to accuracy of the thickness of the lamination plates. This ensures obtaining the necessary and sufficient accuracy to position the bearing members 4 and 5.

The pair of projecting bosses 56 is formed on these rotor stacks 23 and 24. In view of this, as the rotor shaft 21, for example, a columnar-shaped rotor shaft with uniform diameter is applicable. This eliminates a need for highly-accurately processing the both ends 101b of the rotor shaft 101 by cutting and polishing, which is as the example illustrated in FIG. 4.

Further, the pair of projecting bosses 56 is formed on these rotor stacks 23 and 24. This also eliminates a need for using the pair of collar members 105, which is assembled components separated from the motor rotator, as illustrated in FIG. 5.

Here, as illustrated in FIG. 5, to position the bearing members 104 using the collar members 105, a plurality of convex portions is formed to secure the rotor stacks 102 and 103 to the outer peripheral surface of the rotor shaft 101. Accordingly, a caulking process is performed by a plurality of times. In contrast to this, this embodiment eliminates the need for caulking process.

Then, in this embodiment, the columnar-shaped rotor shaft 21 with the uniform diameter is inserted into and secured to the center holes 59 of the rotor stacks 23 and 24 with which the bosses 56 are preliminary integrated. This ensures easily assembling the motor rotator 3.

Thus, this embodiment ensures appropriately positioning the bearing members without increasing the number of assembled components used for the motor rotator 3 or the total number of processes for the assembly.

The above-described embodiments are examples of preferred embodiments of the present disclosure. The technique of the present disclosure is not limited to this. Various modifications or changes of the embodiments are possible without departing from the gist of the disclosure.

For example, with the rotor stacks 23 and 24 of the embodiment, the bosses 56 are formed using the lamination plates made of the material identical to the large-diameter plate-shaped lamination plate 52 for the main stack 54 and the like. By being crimped with the large-diameter plate-shaped lamination plate 52, the boss 56 is integrated with the main stack 54.

Besides, for example, the boss 56 may be made of a material different from the lamination plate of the main stack 54.

The boss 56 (the small-diameter ring-shaped lamination plate 53) may be integrated with the main stack 54 (the large-diameter plate-shaped lamination plate 52) by a method other than crimp such as bonding. Note that, integrating these components by crimp ensures securing the boss 56 to the main stack 54 in the process of forming the rotor stacks 23 and 24. This ensures strongly integrating the boss 56 to the main stack 54 without an increase in the number of processes.

In the embodiment, the rotor shaft 21 is movably inserted into the center holes 59 on the first rotor stack 23 and the second rotor stack 24. The small-diameter ring-shaped lamination plates 53, which will be the bosses 56, are squashed to radially inside. This ensures securing the rotor stacks 23 and 24 to the rotor shaft 21.

Besides, for example, the rotor stacks 23 and 24 and the rotor shaft 21 may be adhesively secured. The center holes 59 of the rotor stacks 23 and 24 may be formed to be an approximately identical diameter to the rotor shaft 21. In this case, the rotor shaft 21 may be press-fitted to the center holes 59.

The center hole on the large-diameter plate-shaped lamination plate 52 may have a diameter larger than the center hole of the small-diameter ring-shaped lamination plate 53. In this case, the rotor shaft 21 may be press-fitted to the center hole on the small-diameter ring-shaped lamination plate 53. This ensures reducing a press fit resistance compared with the case where the rotor shaft 21 is press-fitted to all the plurality of large-diameter plate-shaped lamination plates 52 and the plurality of small-diameter ring-shaped lamination plates 53. Consequently, this ensures reducing a load of work of securing the rotor stacks to the rotor shaft 21.

The embodiment of the present disclosure is an example of the motor device 1 with the motor rotator 3 where the permanent magnet 22 is sandwiched between the magnet-use hollow 55 of the first rotor stack 23 and the magnet-use hollow 55 of the second rotor stack 24.

Besides, for example, the main stacks 54 of the first rotor stack 23 and the second rotor stack 24 may be constituted only by the plurality of large-diameter plate-shaped lamination plates 52. In this case as well, the permanent magnet 22 can be sandwiched and secured between the pair of main stacks 54 formed of the large-diameter plate-shaped lamination plates 52 only.

The motor rotator 3 may include one rotor stack formed of the plurality of large-diameter plate-shaped lamination plates 52 only and a winding wire wound around this rotor stack. In this case as well, stacking integrating the plurality of small-diameter ring-shaped lamination plates 53 on both sides of the one rotor stack ensures highly-accurately forming the pair of bosses 56 projecting both sides of the rotor stack.

The motor device 1 of the embodiment includes the housing 2, which houses the stator member 6. Besides, for example, the motor device 1 may not include the housing 2. In this case, the stator member 6 may be exposedly installed.

The embodiments of the present disclosure may be the following first to third motor rotators, first motor device, and a method for manufacturing the first motor rotator.

The first motor rotator includes a rotor shaft and a rotor stack. The rotor shaft is configured to be journaled to a pair of bearing members of a motor device. The rotor stack is formed by stacking, in an axial direction of the rotor shaft, and integrating a plurality of lamination plates, which generates a magnetic field, and a plurality of small-diameter plates having an outer periphery smaller than the lamination plates. The plurality of small-diameter plates forms a pair of bosses. The pair of bosses projects from both sides of the plurality of lamination plates in the axial direction of the rotor shaft to abut on the pair of bearing members.

The second motor rotator according to the first motor rotator is configured as follows. The plurality of small-diameter plates is small-diameter lamination plates made of a material identical to a material of the lamination plates. The small-diameter plates are crimped in a thickness direction together with the plurality of lamination plates along an outer periphery of the small-diameter plate.

The third motor rotator according to the first or the second motor rotator is configured as follows. The rotor stacks are constituted of a first rotor stack and a second rotor stack. A permanent magnet is sandwiched between the first rotor stack and the second rotor stack.

The first motor device includes a housing, the rotor shaft, the motor rotator according to any of the first to third motor rotators, the pair of bearing members, and a stator member.

The motor rotator includes the rotor stack having the pair of bosses. Into the pair of bearing members, the rotor shaft is to be inserted to abut on the pair of bosses. The bearing members rotatably journal the motor rotator inside the housing. The stator member is disposed at a peripheral area of the rotor stack in the housing The method for manufacturing the first motor rotator is a method for manufacturing the motor rotator where a rotor shaft is rotatably journaled to a pair of bearing members of a motor device. The method includes stacking, in an axial direction of the rotor shaft, and integrating a plurality of lamination plates to generate a magnetic field and a plurality of small-diameter plates having an outer periphery smaller than the lamination plate to form a rotor stack. The method includes inserting the rotor shaft into a center hole of the rotor stack to secure the rotor shaft.

In the rotor stack of the first motor rotator, the small-diameter plates having the outer periphery smaller than the plurality of lamination plates are stacked in the axial direction of the rotor shaft and integrated on both sides of the lamination plates. This forms the pair of projecting bosses. The pair of bosses ensures positioning the pair of bearing members. Moreover, the bosses are formed by stacking the plurality of small-diameter plates in the axial direction of the rotor shaft. Accordingly, accuracy of the amount of projection of the bosses is configured to be accuracy of the thickness of the small-diameter plate. This ensures obtaining necessary and sufficient accuracy to position the bearing members.

The pair of bosses, which positions the bearing members, is formed on the rotor stack sides. In view of this, as the rotor shaft, for example, a columnar-shaped rotor shaft with uniform diameter is applicable. This eliminates a need for processing the center of the rotor shaft so as to have a diameter larger than the both ends to position the bearing members. This also eliminates a need for preparing a pair of collar members, which is assembled components separated from the motor rotator, for the motor rotator. The columnar-shaped rotor shaft with a uniform diameter is inserted into and secured to the center holes of the rotor stacks with which the bosses are preliminary integrated. This ensures easily assembling the motor rotator.

Thus, according to the first motor rotator, the motor rotator with a structure that ensures appropriately positioning the bearing members without increasing the number of assembled components used for the motor rotator or the total number of processes can be easily manufactured.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor rotator comprising:
   a rotor shaft configured to be journaled to a pair of bearing members of a motor device; and
   a rotor stack that includes a plurality of lamination plates and a plurality of small-diameter plates having an outer diameter smaller than an outer diameter of the lamination plates, the lamination plates and the small-diameter plates being stacked in an axial direction of the rotor shaft and integrated, wherein the plurality of small-diameter plates forms each of a pair of bosses, the pair of bosses projecting from both sides of the plurality of lamination plates along the axial direction of the rotor shaft to abut on the pair of bearing members, the pair of bosses being secured to the rotor shaft, each of the pair of bearing members includes an outer rotator and an inner rotator which is rotatable inside the outer rotator, and the outer diameter of the plurality of small-diameter plates is smaller than an outer diameter of the outer rotators.

2. The motor rotator according to claim 1, wherein
the plurality of small-diameter plates is small-diameter lamination plates made of a material identical to a material of the lamination plates, the small-diameter plates including inner crimps, the inner crimps being disposed along an outer periphery of each of the small-diameter plates, the inner crimps bonding the plurality of small-diameter plates and the plurality of lamination plates along a thickness direction.

3. The motor rotator according to claim 2, wherein
the plurality of lamination plates includes inner crimps, the inner crimps being disposed to correspond to the inner crimps of the small-diameter plate.

4. The motor rotator according to claim 3, further comprising a pair of first rotor stack and second rotor stack as the rotor stack; and a permanent magnet sandwiched between the first rotor stack and the second rotor stack.

5. The motor rotator according to claim 2, further comprising a pair of first rotor stack and second rotor stack as the rotor stack; and a permanent magnet sandwiched between the first rotor stack and the second rotor stack.

6. The motor rotator according to claim 1, further comprising a pair of first rotor stack and second rotor stack as the rotor stack; and a permanent magnet sandwiched between the first rotor stack and the second rotor stack.

7. The motor rotator according to claim 6, wherein
the permanent magnet is sandwiched between a first magnet-use hollow of the first rotor stack and a second magnet-use hollow of the second rotor stack.

8. The motor rotator according to claim 6, wherein
the permanent magnet is housed in a first recess of the first rotor stack and a second recess of the second rotor stack.

9. A motor device comprising:

a housing;

the motor rotator according to claim 1 including the rotor shaft and the rotor stack including the pair of bosses;

the pair of bearing members into which the rotor shaft is to be inserted to abut on the pair of bosses, the bearing members rotatably journaling the motor rotator inside the housing; and a stator member disposed at a peripheral area of the rotor stack in the housing.

10. The motor rotator according to claim 1, wherein the pair of bosses are secured to the rotor shaft by squashing the pair of bosses radially inside in a state that the rotor shaft is inserted into the rotor stack.

11. The motor rotator according to claim 1, wherein the pair of bosses are adhesively secured to the rotor shaft.

12. A method for manufacturing a motor rotator, comprising:

stacking, in an axial direction of a rotor shaft, and integrating a plurality of lamination plates and a plurality of small-diameter plates having an outer diameter smaller than an outer diameter of the lamination plates to form a rotor stack, the rotor shaft being configured to be journaled to a pair of bearing members of a motor device;

inserting the rotor shaft into a center hole of the rotor stack;

forming a pair of bosses, each of the pair of bosses being formed by the plurality of small-diameter plates, the pair of bosses projecting from both sides of the plurality of lamination plates along the axial direction of the rotor shaft to abut on the pair of bearing members; and securing the pair of bosses to the rotor shaft, wherein each of the pair of bearing members includes an outer rotator and an inner rotator which is rotatable inside the outer rotator, and the outer diameter of the plurality of small-diameter plates is smaller than an outer diameter of the outer rotators.

13. The method according to claim 12, wherein the pair of bosses are secured to the rotor shaft by squashing the pair of bosses radially inside in a state that the rotor shaft is inserted into the center hole of the rotor stack.

14. The method according to claim 12, wherein the pair of bosses are adhesively secured to the rotor shaft.

15. A method for manufacturing a motor rotator, comprising:

stacking, in an axial direction of a rotor shaft, and integrating a plurality of lamination plates and a plurality of small-diameter plates having an outer diameter smaller than an outer diameter of the lamination plates to form a rotor stack having a pair of first rotor stack and second rotor stack, the rotor shaft being configured to be journaled to a pair of bearing members of a motor device;

inserting the rotor shaft into a center hole of the rotor stack;

forming a pair of bosses, each of the pair of bosses being formed by the plurality of small-diameter plates, the pair of bosses projecting from both sides of the plurality of lamination plates along the axial direction of the rotor shaft to abut on the pair of bearing members;

securing the pair of bosses to the rotor shaft; and sandwiching a permanent magnet between a first magnet-use hollow of the first rotor stack and a second magnet-use hollow of the second rotor stack.

16. The method according to claim 15, wherein the pair of bosses are secured to the rotor shaft by squashing the pair of bosses radially inside in a state that the rotor shaft is inserted into the center hole of the rotor stack.

17. The method according to claim 15, wherein the pair of bosses are adhesively secured to the rotor shaft.

* * * * *